United States Patent
Einig et al.

(10) Patent No.: US 8,500,220 B2
(45) Date of Patent: Aug. 6, 2013

(54) VEHICLE BRAKING SYSTEM

(75) Inventors: Frank Einig, Koblenz (DE); Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 925 days.

(21) Appl. No.: 10/754,109

(22) Filed: Jan. 8, 2004

(65) Prior Publication Data

US 2004/0217647 A1 Nov. 4, 2004

Related U.S. Application Data

(63) Continuation of application No. PCT/EP02/07656, filed on Jul. 9, 2002.

(30) Foreign Application Priority Data

Jul. 13, 2001 (DE) ................... 101 33 409

(51) Int. Cl.
*B60T 8/60* (2006.01)
(52) U.S. Cl.
USPC ........................................... 303/148
(58) Field of Classification Search
USPC .......................... 303/146, 148, 179
See application file for complete search history.

(56) References Cited

U.S. PATENT DOCUMENTS

| | | |
|---|---|---|
| 6,178,368 B1 | 1/2001 | Otake |
| 6,272,420 B1 | 8/2001 | Schramm et al. |
| 6,366,844 B1 | 4/2002 | Woywod et al. |
| 6,384,719 B1 | 5/2002 | Dieckmann |
| 6,554,293 B1 | 4/2003 | Fennel et al. |

FOREIGN PATENT DOCUMENTS

| | | |
|---|---|---|
| DE | 197 51 925 | 5/1999 |
| DE | 198 30 190 | 10/1999 |
| DE | 199 58 221 | 6/2001 |
| WO | 99/30941 | 6/1999 |
| WO | 99/30942 | 6/1999 |

*Primary Examiner* — Xuan Lan Nguyen
(74) *Attorney, Agent, or Firm* — MacMillan, Sobanski & Todd, LLC

(57) ABSTRACT

The invention relates to a vehicle braking system having regulating devices determining the transversely dynamic behavior of the vehicle, in order to maintain or restore stable vehicle behavior, by setting the braking torque on individual vehicle wheels independently of the driver. The performance of the braking system is controlled in this manner to help prevent vehicle rollover (overturning laterally) when negotiating curves. This is accomplished by generating a braking torque on the front wheel on the outside of the curve (or increasing a braking torque that is already set).

6 Claims, 1 Drawing Sheet

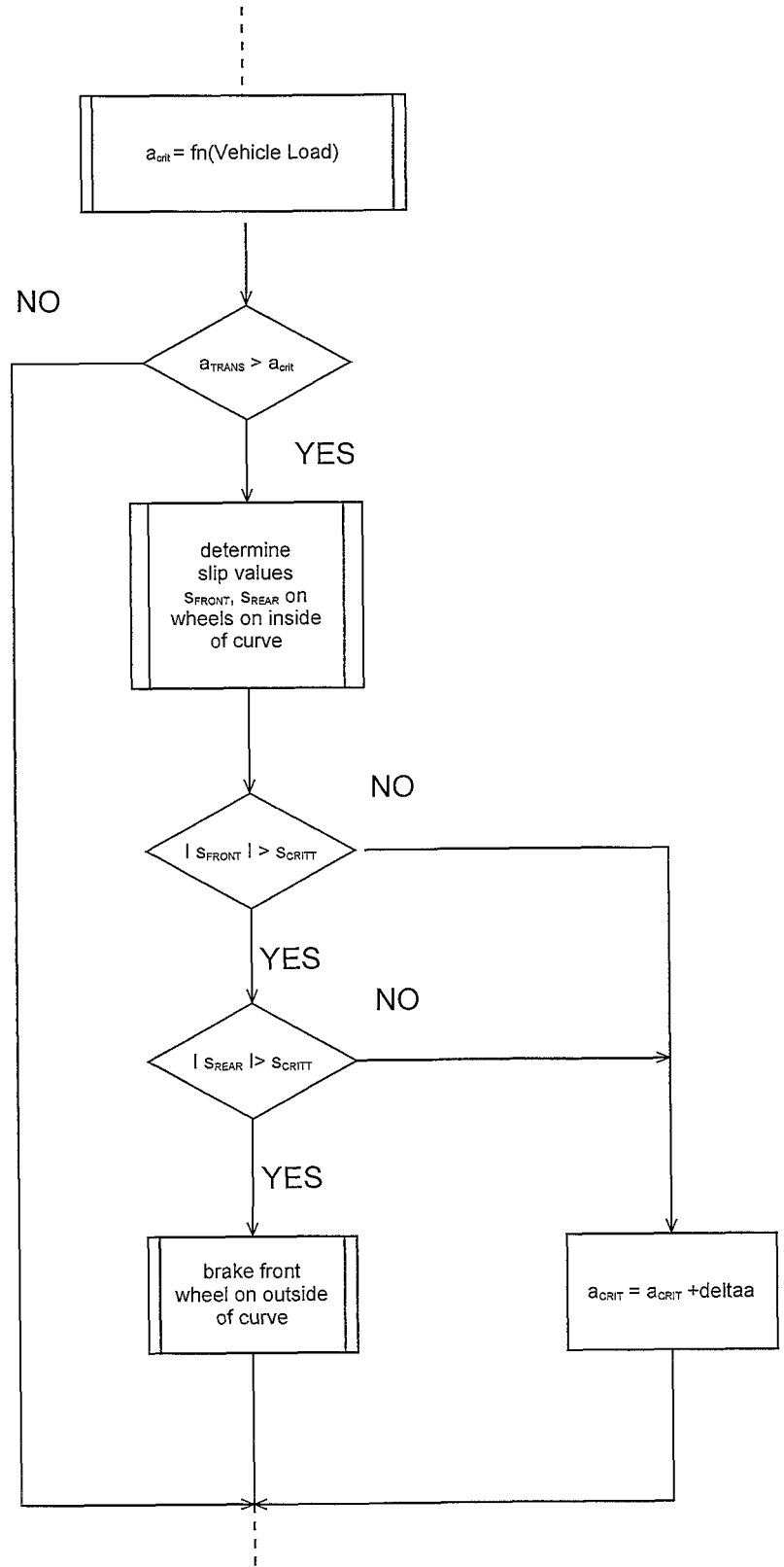

VEHICLE BRAKING SYSTEM

CROSS REFERENCE TO RELATED APPLICATIONS

This application is a continuation of International Application No. PCT/EP02/07656 filed Jul. 9, 2002, the disclosures of which are incorporated herein by reference, and which claimed priority to German Patent Application No. 101 33 409.5 filed Jul. 13, 2001, the disclosures of which are incorporated herein by reference.

BACKGROUND OF THE INVENTION

The invention relates to a vehicle braking system comprising regulating devices, which determine the transversely dynamic behaviour of the vehicle, in order to maintain or restore stable vehicle behaviour by setting the braking torque, independently of the driver, on individual vehicle wheels.

In known fashion, modern braking systems are equipped, in addition to the anti-lock braking system (ABS), which prevents the wheels from locking during braking, with regulating devices which actively restore driving stability by braking individual wheels independently of the driver. Thus drive slip regulation avoids wheel slip during driving. Additionally, driving dynamic regulation increases driving safety quite significantly, because the driver is actively supported in transversely dynamic critical situations, in which the rear wheel on the inside of the curve is braked during under-steering, and the front wheel on the outside of the curve is braked during over-steering. For this purpose, to determine the transversely dynamic behaviour of the vehicle, for instance the steering angle which the driver specifies, the transverse acceleration of the vehicle and the yaw behaviour of the vehicle around its vertical axis are captured.

Overturning stability, i.e. the danger of the vehicle overturning laterally when negotiating curves, is a problem. This danger increases with increasing total vehicle height, and occurs, in particular, on road surfaces with a high coefficient of friction. Because the vehicle then reaches the overturning limit before the skid limit, the drive slip regulation and driving dynamic regulation cannot intervene at all, so that a safety-critical driving state exists.

SUMMARY OF THE INVENTION

The object which has been set for the invention is therefore to configure the performance of said vehicle braking system to prevent the vehicle from overturning laterally when negotiating curves.

To achieve the object, it is proposed that a braking torque should be generated on the front wheel on the outside of the curve, or a braking torque that has already been set should be increased.

The great advantage of the invention is that because of the braking torque which has been generated or increased on the front wheel on the outside of the curve, "slight" under-steering of the vehicle is deliberately caused, since the lateral guiding force on the front wheel on the outside of the curve is reduced, which reliably counteracts the lateral overturning of the vehicle. The result of restoring the overturning stability is a significant safety advantage for the vehicle braking system according to the invention.

There is also no danger of a transversely dynamic critical driving state occurring because of the deliberately caused "slight" under-steering of the vehicle, because depending on the design of the vehicle braking system higher-level or lower-level driving dynamic regulation can intervene, if because of the braking torque which has been generated or increased on the front wheel on the outside of the curve, "critical" under-steering of the vehicle has to be prevented.

How the braking torque on the front wheel on the outside of the curve is generated or increased, in terms of both order of magnitude and course (e.g. in jumps or on a ramp), to force non-critical under-steering of the vehicle in suitable fashion, is determined by, among other things, the steering angle, the vehicle transverse acceleration and the yaw behaviour (yaw velocity) of the vehicle around its vertical axis, stationary vehicle parameters such as, for instance, track width and axle base also being taken into account.

Because the overturning limit of the vehicle depends essentially on its transverse acceleration, the braking torque on the front wheel on the outside of the curve is generated or increased when the vehicle transverse acceleration, or a magnitude which is related to the vehicle transverse acceleration, exceeds a predefined limit. A maximum permitted vehicle transverse acceleration, at which the vehicle does not yet tend to overturn laterally when negotiating curves, is set as the predefined limit. As the magnitude which is related to the vehicle transverse acceleration, for instance the roll angle of the vehicle can be used, provided that it is available in the vehicle braking system by measurement or calculation.

Preferably, the limit for the maximum permitted vehicle transverse acceleration is predefined depending on the loading state of the vehicle, provided that it is available in the vehicle braking system by measurement or calculation. This is because, in particular in the case of light utility vehicles such as small vans, which have a relatively high vehicle centre of gravity, the overturning limit is very strongly dependent on the loading state, particularly if the height of the vehicle centre of gravity is displaced by the application of through loads. The roll angle also increases as the loading increases, because the mass of the vehicle and thus the operative centrifugal force increase. The limit for the maximum permitted vehicle transverse acceleration is therefore reduced as the loading increases.

The limit for the maximum permitted vehicle transverse acceleration is reset to a minimum value at the start of each driving operation. The start of each driving operation is defined by the driver switching on the ignition. For the minimum value with which lateral overturning can be avoided even in extreme situations, in practice a vehicle transverse acceleration of the order of magnitude of 3 m/s$^2$ has been shown to be safe.

To adjust the responsiveness of the actual overturning limit in actual driving operation, the limit for the maximum permitted vehicle transverse acceleration is increased during uninterrupted driving operation, that is if no switching on or off of the ignition by the driver is identified, as long as the wheels on the inside of the curve do not lose contact with the road surface. To test whether the wheels on the inside of the curve lose contact, the slip on the wheels on the inside of the curve is determined, and there is then a test for whether the amount of the slip is below, or not above, a predefined value. A predefined slip value of the order of magnitude of 10% has been shown to be appropriate in practice.

Likewise, as the condition for generating or increasing the braking torque on the front wheel on the outside of the curve, loss of contact by the wheels on the inside of the curve is used, that is when the amount of the slip on the wheels on the inside of the curve is above, or not below, a predefined value.

A driven wheel on the inside of the curve is tested for whether it is above, or not below, a predefined positive slip value.

In the case of a non-driven wheel on the inside of the curve, a braking torque is generated, or a previously set braking torque is increased, to test the non-driven wheel on the inside of the curve for whether it is below, or not above, a predefined negative slip value.

On a driven wheel on the inside of the curve, for testing, as in the case of a non-driven wheel on the inside of the curve, a braking torque is generated or increased if the drive train of the vehicle is not closed, i.e. there is no positive engagement through the clutch and transmission.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a flow chart illustrating aspects of the invention.

DETAILED DESCRIPTION OF THE INVENTION

Below, the invention is explained in more detail on the basis of an embodiment. The only drawing, FIG. 1, shows a flowchart, which is executed cyclically. First, there is a test for whether the current vehicle transverse acceleration $a_{TRANS}$ exceeds a predefined limit acceleration $a_{CRIT}$. If not, the current pass is aborted, and in the following cycle the next pass is begun.

If the current vehicle transverse acceleration $a_{TRANS}$ exceeds the predefined limit acceleration $a_{CRIT}$, the slip values $s_{FRONT}$, $s_{REAR}$ on the wheels on the inside of the curve are determined. The amounts or absolute values of the slip values $|s_{FRONT}|$, $|s_{REAR}|$ are then checked for whether the slip on both wheels on the inside of the curve exceeds a predefined limit slip $s_{CRIT}$. If not, the limit acceleration $a_{CRIT}$ is increased by a specified amount $\delta a$.

If and only if the slip on both wheels on the inside of the curve exceeds a predefined limit slip $s_{CRIT}$, the front wheel on the outside of the curve is braked, to prevent the vehicle from overturning laterally.

In the embodiment, the limit acceleration $a_{CRIT}$ is increased in steps by the specified amount $\delta a$. However, for a person skilled in the art, it is self-evident that alternatively the limit acceleration $a_{CRIT}$ can be increased according to a linear, progressive or degressive function. What is decisive is that by increasing the limit acceleration $a_{CRIT}$, the responsiveness is adjusted, so that no "unnecessary" braking interventions take place, both to determine the slip on the wheels on the inside of the curve, and to brake the front wheel on the outside of the curve. Ride comfort is thus maintained.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is a:

1. A vehicle braking system comprising:
regulating devices configured to determine the transverse dynamic behavior of the vehicle with the vehicle braking system configured to maintain or restore stable vehicle behavior by setting braking torque on individual wheels independently of the driver,
the vehicle braking system also configured to generate a braking torque on a front wheel on the outside of a curve, or to increase a braking torque on the front wheel on the outside of the curve that has already been set, to prevent the vehicle from overturning laterally when negotiating curves,
the vehicle braking system further configured to activate a different level of driving dynamic regulation when the regulating devices determine that an undesired understeering of the vehicle is caused by the braking torque which has been generated, or increased, on the front wheel on the outside of the curve,
the vehicle braking system additionally configured to generate, or increase, the braking torque on the front wheel on the outside of the curve when a parameter indicative of the vehicle transverse acceleration exceeds a transverse acceleration limit that has a variable initial value that is determined as a function of a loading state of the vehicle and that is then increased from said initial value according to a predetermined function during driving operation as long as an amount of slip on wheels on the inside of the curve does not exceed a predefined value, and
the vehicle braking system also being configured to reset the transverse acceleration limit at the start of each driving operation.

2. The vehicle braking system according to claim 1, wherein the vehicle braking system is configured to generate or increase the braking torque on the front wheel on the outside of the curve when the amount of slip on only the wheels on the inside of the curve exceeds a predefined value.

3. The vehicle braking system according to claim 2, wherein the vehicle braking system is configured to test a driven wheel on the inside of the curve for whether an amount of slip exceeds a predefined positive slip value.

4. The vehicle braking system according to claim 2, wherein the braking torque on the front wheel on the outside of the curve is a first braking torque, and wherein the vehicle braking system is configured to generate a second braking torque, or to increase a previously set second braking torque on a non-driven wheel on the inside of the curve to test the non-driven wheel on the inside of the curve for whether an amount of slip does not exceed a predefined negative slip value.

5. The vehicle braking system according to claim 1, wherein the vehicle braking system is configured to increase the value of the initial transverse acceleration limit during driving operation as long as the amount of slip on wheels on the inside of the curve does not exceed a predefined value.

6. The vehicle braking system according to claim 5, wherein the predefined value for the amount of slip on the wheels of the inside of the curve does not exceed 10%.

* * * * *